March 29, 1932.  J. F. KREID  1,851,392
COMPRESSED AIR AND GAS BLOWTORCH
Filed March 10, 1931  2 Sheets-Sheet 1
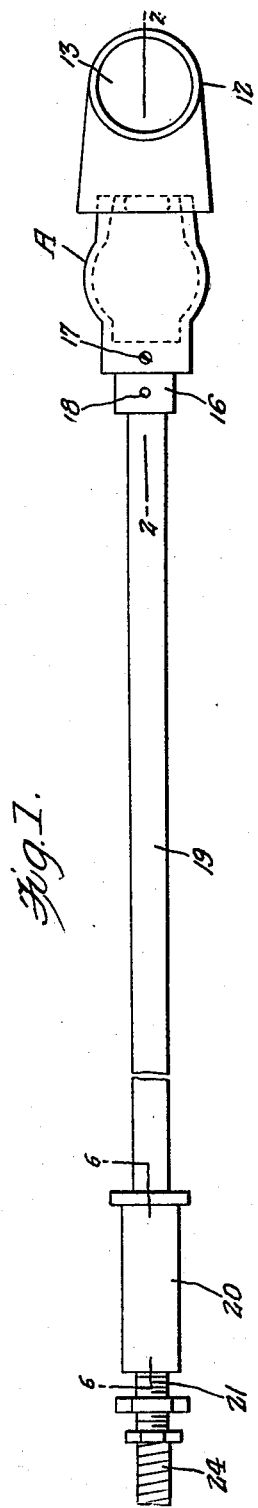
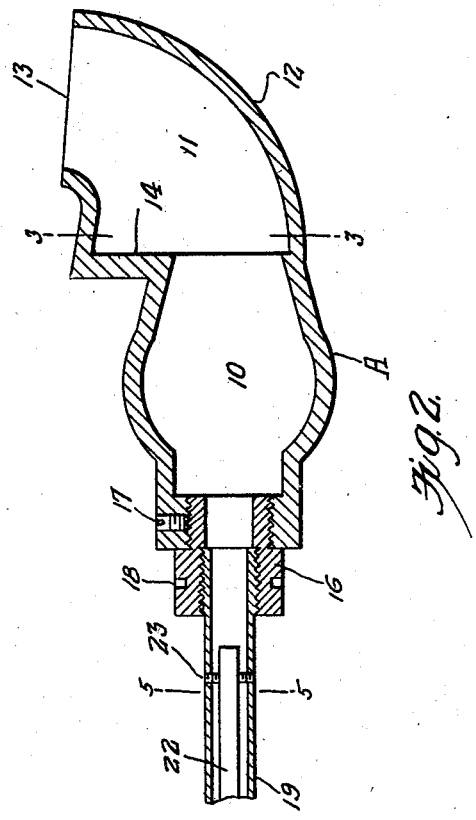
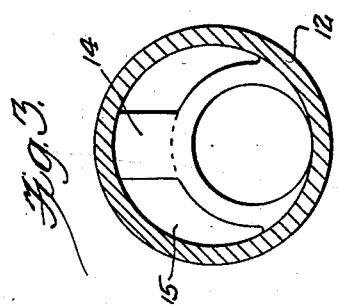
Inventor
John F. Kreid,
By Clarence A. O'Brien
Attorney March 29, 1932. J. F. KREID 1,851,392
COMPRESSED AIR AND GAS BLOWTORCH
Filed March 10, 1931 2 Sheets-Sheet 2
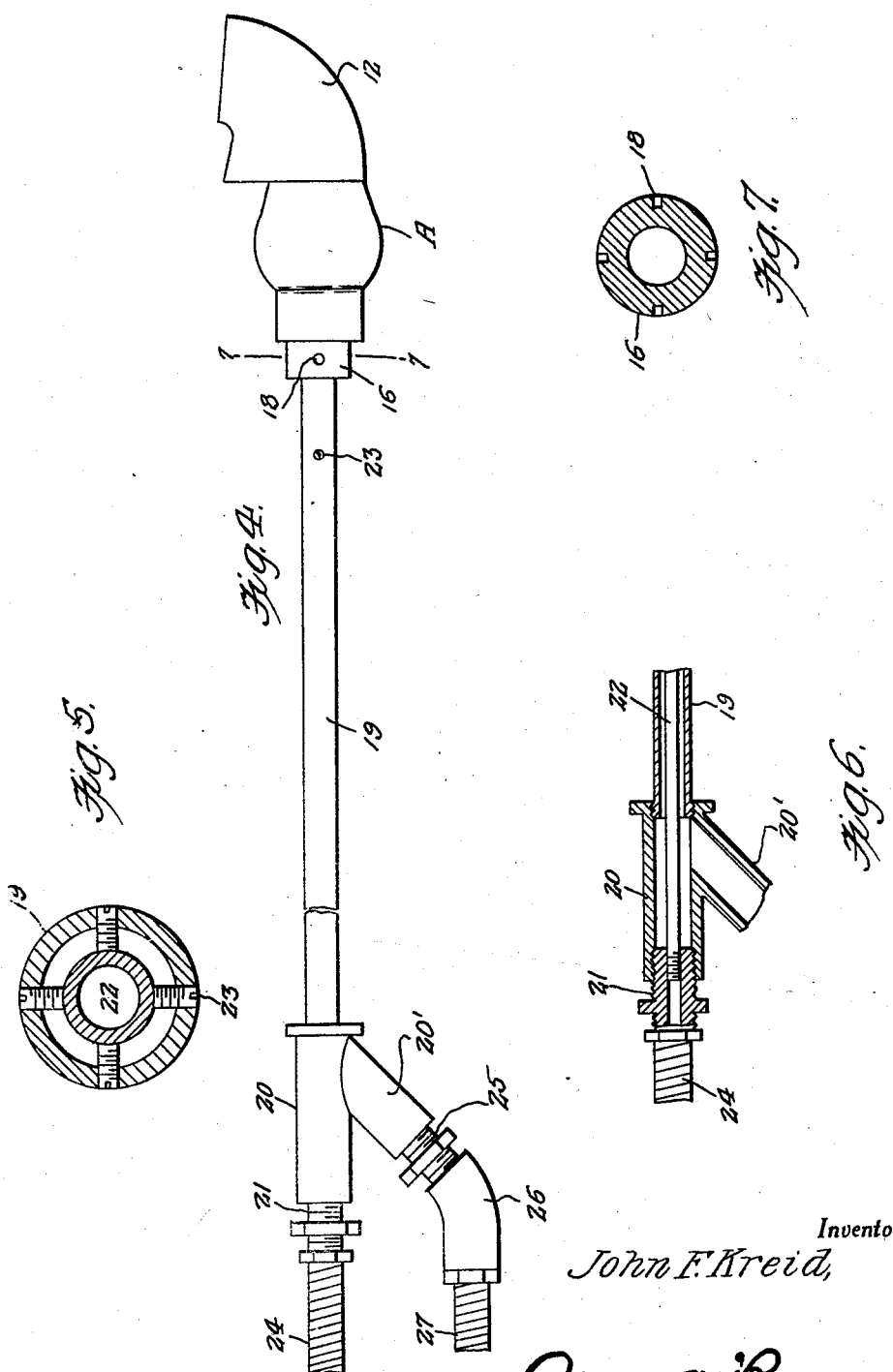
Inventor
John F. Kreid,
By Clarence A. O'Brien
Attorney Patented Mar. 29, 1932

1,851,392

UNITED STATES PATENT OFFICE

JOHN FREDERICK KREID, OF EAST LIVERPOOL, OHIO

COMPRESSED AIR AND GAS BLOWTORCH

Application filed March 10, 1931. Serial No. 521,532.

This invention relates to a blow torch for use with compressed air and gas, the general object of the invention being to provide a torch having a hollow handle part, a tube connected to a supply of compressed air extending through the hollow handle to a point adjacent the head of the torch with means connecting the outer end of the hollow handle to a supply of gas whereby the air flowing from the tube into the head will act to draw gas through the hollow handle into the head whereby the air and gas will be mixed together and produce an intense flame when the mixture is lighted in its passage from the head.

Another object of the invention is to so construct and arrange the parts that there is no danger of the parts exploding, and one which can be manufactured to sell at low cost and which is not likely to get out of order and will work regardless of weather conditions, and may be used inside or outside, and is easy to handle.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings, wherein like characters denote like or corresponding parts throughout the several views, and in which:—

Figure 1 is an elevation of the device.
Fig. 2 is a section on the line 2—2 of Fig. 1.
Fig. 3 is a section on the line 3—3 of Fig. 2.
Fig. 4 is a side view.
Fig. 5 is a section on the line 5—5 of Fig. 2.
Fig. 6 is a section on the line 6—6 of Fig. 1.
Fig. 7 is a section on the line 7—7 of Fig. 4.

In these drawings, the letter A indicates the head of the torch which is formed with an inner chamber 10 and an outer chamber 11, the chamber 10 having its intermediate portion enlarged and from which enlargement the walls of the chamber taper to the point where the chamber communicates with the chamber 11. This part of the head which carries the chamber 11 is substantially elbow-shaped as shown at 12 with its discharge opening 13 at one side thereof. Said chamber 11 has a rear wall 14 which is formed with the air inlet openings 15 so that outside air can enter the chamber 11 through these openings. An adapter 16 is threaded into the inner end of the head and is in communication with the chamber 10, this adapter being held in place by the set screw 17 and its outer part is formed with the tool receiving recesses 18.

A handle forming tube 19 is threaded into the adapter, and a two-part coupling 20 is threaded to the outer end of the tube 19. A nipple 21 is threaded in the straight part of the coupling 20 and a small tube 22 has one end threaded in the nipple and its other end terminating a short distance in rear of the point of connection of the tube 19 with the head, and this end is held in place by the set screws 23 which are adjusted to hold the small tube 22 exactly at the center of the bore of the tube 19. The parts can be welded to prevent leakage around the set screws 23 after they have been properly adjusted.

A hose or tube 24 connects the nipple 21 to a supply of compressed air. A nipple 25 is connected with the branch 20' of the coupling 20 and an elbow 26 is connected with said nipple. A hose or tube 27 is connected with the elbow and leads to a supply of artificial or natural gas.

From the foregoing it will be seen that when a suitable valve either placed in the device itself or in the supply line is opened compressed air will flow from the hose 24 and through the small pipe 22 and will then pass from the end of the pipe 22 thru the front end of the tube 19 into the chamber 10 and due to the escape of the stream of compressed air into the outlet end of the gas tube 19 a suction will be created in said tube 19 which will draw gas thru the hose 27 and the rest of the parts into the tube 19 where the gas will mix with the compressed air in the chamber 10 and then pass into the chamber 11 where it is further mixed with the air flowing into the chamber 11 through the openings 15, so that when the gas is lighted as it escapes from the opening 13, an intense flame will be produced.

Due to the great proportion of air mixed with the gas the combustion will be practically perfect, and the chamber 10 not only acts as a mixing chamber, but also as a preheating chamber due to its association with the part 12 containing the chamber 11. This arrangement of parts, also keeps the tube 19, which is a handle, cool.

It is thought from the foregoing description that the advantages and novel features of the invention will be readily apparent.

It is to be understood that changes may be made in the construction and in the combination and arrangement of the several parts, provided that such changes fall within the scope of the appended claims. It will be understood of course, that the head may be made straight when desired.

Having thus described my invention, what I claim as new is:—

1. A torch of the class described comprising a head having a front chamber provided with an outlet opening and a flat rear wall formed with air openings, and a rear chamber having its walls tapering forwardly with its small front end connected to said rear wall with the two chambers in communication with each other, a tube connected to the rear end of the rear chamber, an angle coupling connected to the rear end of the tube, a plug closing the rear end of the straight part of the coupling, means for connecting the plug to a source of compressed air, a small tube having its rear end connected with the plug and said small tube passing through the coupling through a part of the first-mentioned tube and terminating a distance from the front end of said first-mentioned tube, and means for connecting the angle part of the coupling to a supply of gas.

2. A torch of the class described comprising a head having a front chamber provided with an outlet opening and an enlarged rear part having a flat rear wall, and a rear chamber having its walls tapering forwardly with its small front end connected to said rear wall with the two chambers in communication with each other, a straight tube of the same internal diameter throughout connected to the rear end of the rear chamber, an angle coupling connected to the rear end of the tube, a plug closing the rear end of the straight part of the coupling, means for connecting the plug to a source of compressed air, a small straight tube at the same diameter throughout having its rear end connected with the plug and said small tube passing through the coupling and through a part of the first-mentioned tube and terminating a distance from the front end of the first-mentioned tube, small internal projections carried by the outer tube and engaging the front end of the small inner tube to hold the same centrally in the outer tube, and means for connecting the angle part of the coupling to a supply of gas.

In testimony whereof I affix my signature.

JOHN FREDERICK KREID.